(12) United States Patent
Nagahama et al.

(10) Patent No.: US 7,405,533 B2
(45) Date of Patent: Jul. 29, 2008

(54) METHOD AND CONTROL CIRCUIT FOR CONTROLLING PHASE SPLITTING START SINGLE-PHASE INDUCTION MOTOR

(75) Inventors: Tsuneo Nagahama, Nagaokakyo (JP); Yoshiaki Yokoi, Nagaokakyo (JP)

(73) Assignee: Tsubaki Emerson Co., Kyoto (JP)

( * ) Notice: Subject to any disclaimer, the term of this patent is extended or adjusted under 35 U.S.C. 154(b) by 5 days.

(21) Appl. No.: 11/551,787

(22) Filed: Oct. 23, 2006

(65) Prior Publication Data

US 2007/0090784 A1    Apr. 26, 2007

(30) Foreign Application Priority Data

Oct. 24, 2005    (JP)    ............... 2005-308981

(51) Int. Cl.
*H02P 1/44*    (2006.01)
(52) U.S. Cl. .................. 318/751; 318/778; 318/753
(58) Field of Classification Search ................ 318/751, 318/785, 778, 786, 753
See application file for complete search history.

(56) References Cited

U.S. PATENT DOCUMENTS 5,119,732 A * 6/1992 Lisy .......................... 104/48
5,162,718 A * 11/1992 Schroeder .................. 318/794
5,528,120 A * 6/1996 Brodetsky .................. 318/785
6,252,752 B1 * 6/2001 Nagahama .................. 361/31

FOREIGN PATENT DOCUMENTS

| JP | 59-028889 | 2/1984 |
|---|---|---|
| JP | 64-043081 | 2/1989 |
| JP | 2948902 | 7/1999 |
| JP | 2000-032786 | 1/2000 |
| JP | 2005-151625 | 6/2005 |

* cited by examiner

*Primary Examiner*—Rina I Duda
(74) *Attorney, Agent, or Firm*—Renner, Otto, Boisselle & Sklar, LLP

(57) ABSTRACT

After a power source is turned on, the motor stars by feeding a current to the auxiliary wiring for a first predetermined period. Then, a voltage induced in the auxiliary wiring is detected. Whether or not the detected inducted voltage is lower than a predetermined voltage is judged. The detected induced voltage is judged to be lower than the predetermined voltage when the shredder cannot cut the paper and the rotation speed of the motor is decreased. In this case, since the current is fed to the auxiliary wiring for a second predetermined period, the rotation speed of the motor is increased and an output torque is also increased, which leads to the cuttable state.

6 Claims, 3 Drawing Sheets

METHOD AND CONTROL CIRCUIT FOR CONTROLLING PHASE SPLITTING START SINGLE-PHASE INDUCTION MOTOR

CROSS-REFERENCED TO RELATED APPLICATIONS

This Nonprovisional application claims priority under 35 U.S.C. § 119(a) on Patent Application No. 2005-308981 filed in Japan on Oct. 24, 2005, the entire contents of which are hereby incorporated by reference.

BACKGROUND OF THE INVENTION

1. Field of the Invention

The present invention relates to a method and a control circuit for controlling a drive of a phase splitting start single-phase induction motor. More particularly, the present invention relates to a method and a control circuit for controlling a drive of a phase splitting start single-phase induction motor used in a shredder.

2. Description of Related Art

Sometimes, there is a shredder that uses a phase splitting start single-phase induction motor having a mechanical governor switch, as a driving source for a cutting mechanism. In such a shredder, at a time of a start, a current flows into a main wiring of the motor, and a current flows through a mechanical governor switch, which is on, even into an auxiliary wiring. Then, when a rotation speed of the motor is increased to a predetermined speed, the mechanical governor switch is turned off. As this result, since the current of the auxiliary wiring is shut off, the motor is then rotated only by the current flowing into the main wiring, and the cutting mechanism is driven.

FIG. 1A and FIG. 1B are timing charts showing the rotation speed of the motor when the conventional phase splitting start single-phase induction motor having the mechanical governor switch is used in the shredder (FIG. 1A) and the on/off state of the mechanical governor switch (FIG. 1B).

In the above mentioned conventional shredder, when a paper whose quantity exceeds the performance of the cutting mechanism is supplied while the paper is cut, the paper cannot be cut. In this case, as shown in FIG. 1A, the rotation speed of the motor is decreased. Then, when the rotation speed of the motor is decreased to a predetermined switching speed (at a point C) to be fed the current to the auxiliary wiring, the mechanical governor switch is again turned on, and the current again flows into the auxiliary wiring. Thus, the rotation speed of the motor is increased, and an output torque is also made larger (shown by a curve D between the point C and a point A), which enables the paper to be again cut.

Then, when the rotation speed of the motor is gradually increased and reaches the above mentioned switching speed (at the point A), the mechanical governor switch is again turned off. In this way, when the mechanical governor switch is again turned off, the output torque of the motor begins to be short (shown by a curve B between the point A and the point C). As this result, the paper again cannot be cut. In this case, the rotation speed of the motor is again decreased to the switching speed (at the point C). Hence, the mechanical governor switch is again turned on.

The conventional shredder has a problem of an occurrence of a chattering phenomenon where as mentioned above, the mechanical governor switch repeats the on/off state, as shown in FIG. 1B.

Also, when the chattering phenomenon is generated in the mechanical governor switch, the output torque of the motor is rippled. As this result, impact force is repeatedly applied to a cutter of the shredder. Thus, there is a problem that the cutter is deformed and a blade is spilled.

Also, in the above-mentioned situation, the mechanical governor switch repeatedly turns on and off the large load current flowing into the motor in the overload state. Thus, when contacts of the mechanical governor switch are opened (it is turned off), electric spark is generated between the contacts. This fact brings about a problem of parts life that the contact life of the mechanical governor switch is made shorter. Moreover, inside the shredder, there is a safety problem that the generation of paper dust causes the possibility of fire.

Also, there is a problem that the outer shape of the phase splitting start single-phase induction motor becomes larger when the mechanical governor switch is installed.

It is noted that the mechanical governor switch can be adjusted so as to determine the timing when the current flowing into the auxiliary wiring is shut off, in accordance with the rotation speed of the motor. However, in the case that the current again flows into the auxiliary wiring at the time of the overload, it is very difficult to adjust to the proper rotation speed so that the contacts of the mechanical governor switch are not chattered.

In view of the above-mentioned problems, instead of the mechanical governor switch, the use of a switching circuit of a non-contact type has been variously proposed as described below.

Japanese Patent Application Laid-Open No.59-28889 (1984) discloses a start control apparatus of a single-phase induction motor for cutting off an auxiliary wiring when a voltage induced in a main wiring becomes higher than that in an auxiliary wiring.

Japanese Patent Application Laid-Open No.2000-32786 discloses a starter for a single-phase induction motor for cutting off an auxiliary wiring based on an electromotive force induced in an auxiliary wiring.

Japanese Patent No. 2948902 discloses an electronic circuit for starting a single-phase induction motor which cuts off an auxiliary wiring at a predetermined time after a start.

Japanese Patent Application Laid-Open No. 2005-151625 discloses a governor switch for cutting off an auxiliary wiring based on a motor rotation speed.

Japanese Patent Application Laid-Open No. 64-43081 (1989) discloses a motor start control circuit which carries out an acceleration or restart, by feeding a current into an auxiliary wiring, in a case of an overload state.

However, the above-mentioned problem that the contacts of the mechanical governor switch are chattered cannot be said to be solved by any of the conventional techniques.

BRIEF SUMMARY OF THE INVENTION

The present invention is proposed in view of the above-mentioned circumstances. It is therefore an object of the present invention to provide a method and a circuit for controlling a phase splitting start single-phase induction motor which, since a switching circuit of a non-contact type is used, even in a case of a use as a driving source for a cutting mechanism of a shredder, of course, there is neither reduction in the parts life caused by electric spark, nor fear of fire occurrence, and a chattering resulting from a lack of a cutting performance is never induced, and a cutter is not deformed and a blade is not spilled, and a miniaturization is further attained.

A first aspect of a control method according to the present invention is a method for controlling a drive of a phase splitting start single-phase induction motor having an auxiliary wiring for starting, and is characterized by comprising the steps of feeding a current to the auxiliary wiring for a first predetermined period, after a power source is turned on; detecting a voltage induced in the auxiliary wiring, after an elapse of the first predetermined period; judging whether or not the detected induced voltage is lower than a predetermined voltage; and feeding the current to the auxiliary wiring for a second predetermined period, each time the induced voltage is judged to be lower than the predetermined voltage.

Also, a second aspect of a control method is, in the first aspect, characterized in that the motor is used to drive a shredder for cutting a paper, in the step of judging, the voltage induced in the auxiliary wiring is judged to be lower than the predetermined voltage when the shredder becomes in a state where the paper can not be cut, and by feeding the current to the auxiliary wiring for the second predetermined period, the shredder becomes in a state where the paper can be cut.

Moreover, a first aspect of a control circuit according to the present invention is a control circuit for driving and controlling a phase splitting start single-phase induction motor having an auxiliary wiring for starting, and is characterized by comprising: current feeding means for feeding a current to the auxiliary wiring; detecting means for detecting a voltage induced in the auxiliary wiring; judging means for judging whether the induced voltage detected by the detecting means is lower than a predetermined voltage; and controlling means for controlling the current feeding means so that after a power source is turned on, the motor is started by once feeding the current to the auxiliary wiring for a first predetermined period, and after the current is fed for the first predetermined period, each time the induced voltage detected by the detecting means is judged to be lower than the predetermined voltage by the judging means, the current is fed to the auxiliary wiring for a second predetermined period.

Also, a second aspect of the control circuit according to the present invention is, in the first aspect, characterized in that the current feeding means including: first current feeding means for, after a power source is turned on, starting the motor by once feeding the current to the auxiliary wiring for a first predetermined period; and second current feeding means for, after the current is fed for the first predetermined period, each time the induced voltage detected by the detecting means is judged to be lower than the predetermined voltage by the judging means, feeding the current to the auxiliary wiring for a second predetermined period.

Furthermore, a third aspect of the control circuit according to the present invention is, in any one of the first and second aspects, characterized in that the motor is used to drive a shredder for cutting a paper, the judging means judges that the voltage induced in the auxiliary wiring is lower than the predetermined voltage when the shredder becomes in a state where the paper ban not cut, and the controlling means makes the shredder become in a state where the paper can be cut, by controlling the current feeding means so that the current is fed to the auxiliary wiring for the second predetermined period, each time the judging means judges that the voltage induced in the auxiliary wiring is lower than the predetermined voltage.

In the control method and control circuit of the phase splitting start single-phase induction motor according to the present invention, after the power source is turned on, the current is fed to the auxiliary wiring for the first predetermined period. Thus, the motor is started. After that, the voltage induced in the auxiliary wiring is detected, thereby judging whether or not the detected induced voltage is lower than the predetermined voltage. Each time this judged result is lower than the predetermined voltage, the current is fed to the auxiliary wiring for the second predetermined period.

Also, in the control method and control circuit of the phase splitting start single-phase induction motor according to the present invention, the phase splitting start single-phase induction motor is used to drive the shredder for cutting the paper. In this case, when the shredder becomes in the state that it cannot cut the paper, the voltage induced in the auxiliary wiring becomes lower than the predetermined voltage. Since this state can be obtained as the judged result, the current is fed to the auxiliary wiring for the second predetermined period, and the motor is re-started or accelerated, which enables the paper to be cut.

According to the control method and control apparatus of the phase splitting start single-phase induction motor based on the present invention as mentioned above, the control for the phase splitting start single-phase induction motor where, each time the rotation speed of the motor is decreased after the start, the current is fed to the auxiliary wiring for the second predetermined period, thereby re-starting or accelerating the motor can be attained by using the switching circuit of the non-contact type.

According to the control method and control apparatus of the phase splitting start single-phase induction motor based on the present invention as mentioned above, when the phase splitting start single-phase induction motor is used in the shredder, the chattering caused by the lack of the cutting performance is not generated, the cutter is never deformed, the blade is never spilled, and there is neither reduction in the parts life resulting from the generation of the electric spark, nor the fear of the fire. Also, the phase splitting start single-phase induction motor can be miniaturized.

The above and further objects and features of the invention will more fully be apparent from the following detailed description with accompanying drawings.

DETAILED DESCRIPTION OF THE PRESENT INVENTION

The present invention will be described below with reference to the drawings showing its embodiment.

Figure 1:
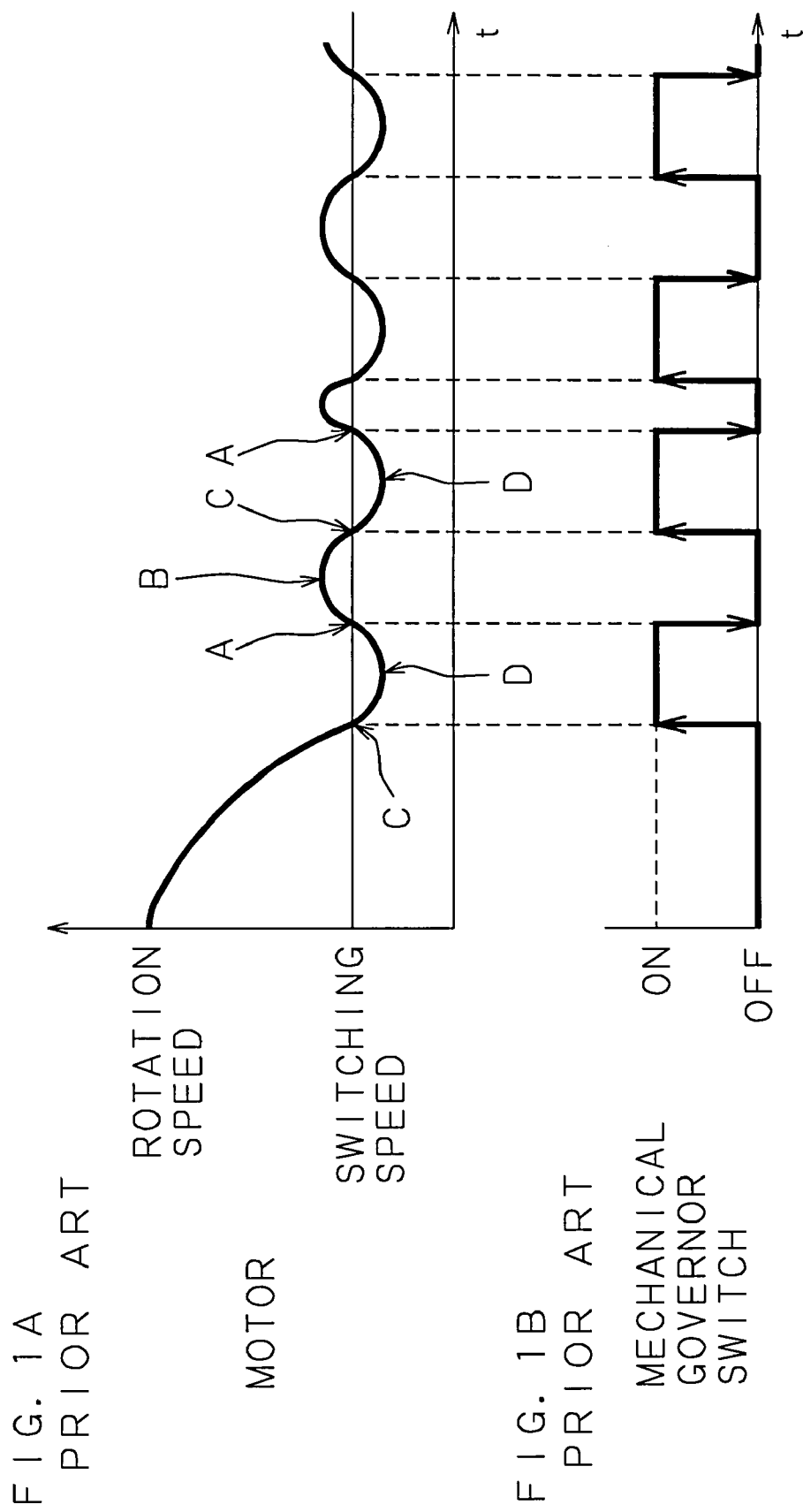
FIG. 1A and FIG. 1B are timing charts showing the rotation speed of the motor when the conventional phase splitting start single-phase induction motor having the mechanical governor switch is used in the shredder (FIG. 1A) and the on/off state of the mechanical governor switch (FIG. 1B)
Figure 2:
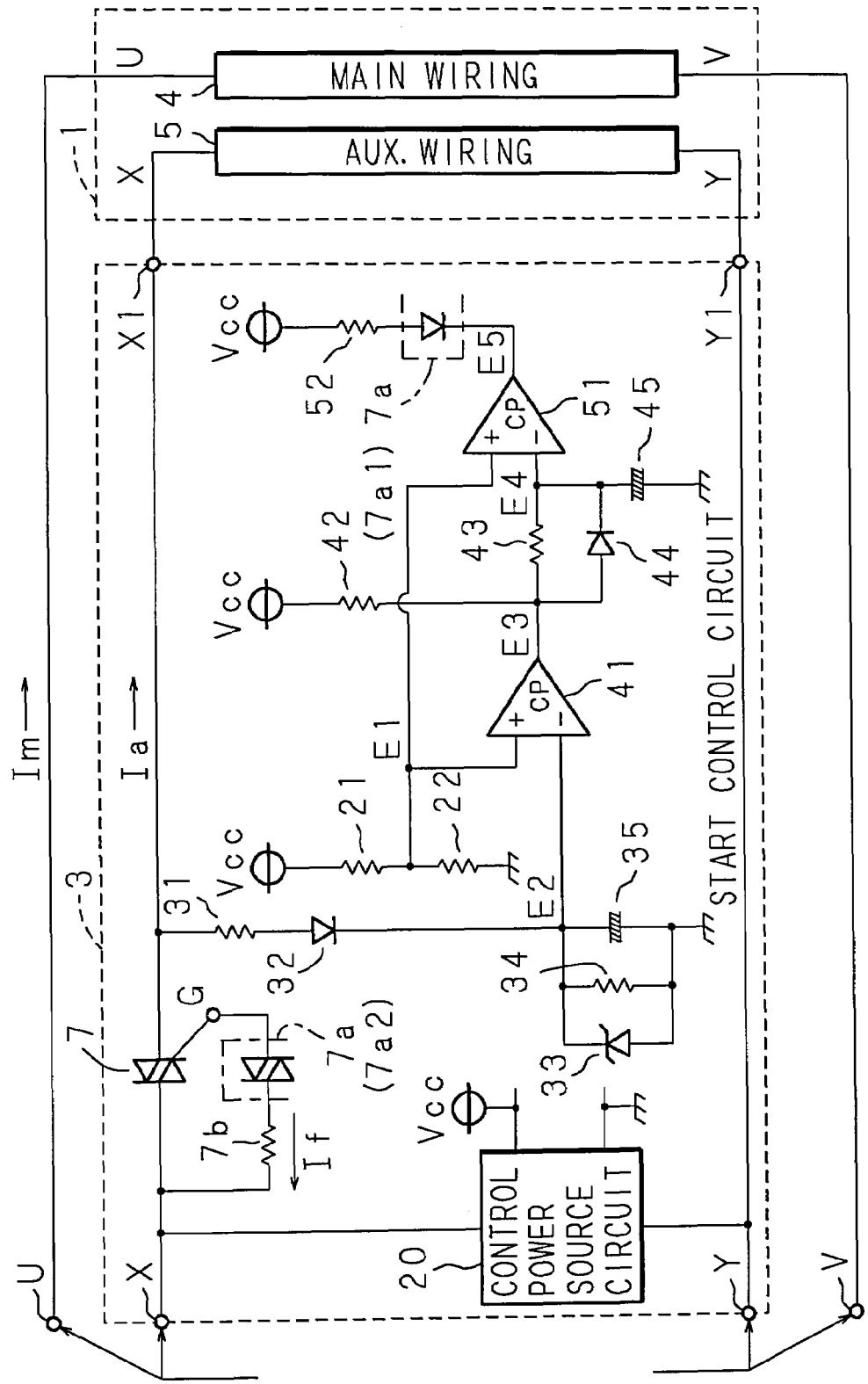
FIG. 2 is a circuit diagram showing an essential portion configuration of one embodiment of the control circuit of the phase splitting start single-phase induction motor according to the present invention.

FIG. 2 is a circuit diagram showing an essential portion configuration of one embodiment of the control circuit of the phase splitting start single-phase induction motor according to the present invention. The control circuit shown in FIG. 2 is provided with a start control circuit 3, a phase splitting start single-phase induction motor 1 controlled by the start control circuit 3, terminals U, V to feed an alternating current to the phase splitting start single-phase induction motor 1, and the like. Hereafter, it is noted that the phase splitting start single-phase induction motor 1 is merely referred as the motor 1.

An alternating current power source is connected between the terminals U, V. The terminals U, V are connected to both ends of a main wiring 4 of the motor 1, respectively. Also, the alternating current power source is connected between terminals X, Y of the start control circuit 3. The terminals X, Y are connected through terminals X1, Y1 of the start control circuit 3 to both ends of an auxiliary wiring 5 of the motor 1, respectively. However, a TRIAC 7 (triode AC switch) which will be described later is interposed between the terminal X and the terminal X1 inside the start control circuit 3. Thus, the current feeding to the auxiliary wiring 5 is turned on/off in accordance with the continuity/non-continuity of the TRIAC 7.

A control power source circuit 20 is connected between the terminals X, Y of the start control circuit 3. The control power source circuit 20 converts the alternating current supplied by the alternating current power source into a direct current for control and outputs as a direct current power source Vcc.

One terminal of a resistor 7b and one terminal of the TRIAC 7 serving as current feeding means are connected to the terminal X. The other terminal of the resistor 7b is connected to one terminal on a secondary side (7a2) of a photo TRIAC 7a. The other terminal on the secondary side of the photo TRIAC 7a is connected to a gate G of the TRIAC 7. The other terminal of the TRIAC 7 is connected to the terminal X1.

One terminal of a resistor 31 is connected between the other terminal of the TRIAC 7 and the terminal X1. The other terminal of the resistor 31 is connected to an anode of a diode 32. A cathode of the diode 32 is connected to a cathode of a Zener diode 33, one terminal of a resistor 34, and a positive pole of an electrolytic condenser 35. An anode of the Zener diode 33, the other terminal of the resistor 34, and a negative pole of the electrolytic condenser 35 are grounded. Thus, the Zener diode 33, the resistor 34 and the electrolytic condenser 35 constitute a parallel circuit whose one terminal is connected to the diode 32 and the other terminal is grounded.

It is noted that the resistor 31, the diode 32 and the electrolytic condenser function as detecting means for detecting a voltage induced in the auxiliary wiring 5.

A positive pole voltage E2 of the electrolytic condenser 35 is applied to a minus input terminal of a first comparator 41 serving as judging means. A division voltage E1 of the voltage of the direct current power source Vcc, which is divided by resistors 21 and 22, is applied to a plus input terminal of the first comparator 41.

An output terminal of the first comparator 41 is connected through resistor (first current feeding means and second current feeding means) 42 to the direct current power source Vcc. Also, the output terminal of the first comparator 41 is connected through resistor (first current feeding means and second current feeding means) 43 to minus input terminal of second comparator (first current feeding means and second current feeding means) 51 and a positive pole of the electrolytic condenser (first current feeding means and second current feeding means) 45, respectively. A negative pole of the electrolytic condenser 45 is grounded.

It is noted that the foregoing photo TRIAC 7a, resistors 42, resistors 43, second comparator 51 and electrolytic condenser 45 function as controlling means for controlling the current feeding to the auxiliary wiring 5 by the TRIAC 7 as the current feeding means.

Moreover, the output terminal of the first comparator 41 is connected to an anode of a diode 44. A cathode of the diode 44 is connected to the anode of the electrolytic condenser 45.

The division voltage E1 of the voltage of the direct current power source Vcc, which is divided by the resistors 21 and 22, is applied to a plus input terminal of the second comparator 51. It is noted that the division voltage E1 of the voltage of the direct current power source Vcc, which is divided by the resistors 21 and 22, is also applied to the plus input terminal of the first comparator 41, as mentioned above. An output terminal of the second comparator 51 is connected through a primary side (7a1) of the photo TRIAC 7a and a resistor 52 to the direct current power source Vcc.

The operation of the control circuit for the phase splitting start single-phase induction motor having the above-mentioned configuration, namely, the control method for the phase splitting start single-phase induction motor according to the present invention will be described below with reference to the timing charts of FIG. 3A through FIG. 3F.

Figure 3A:
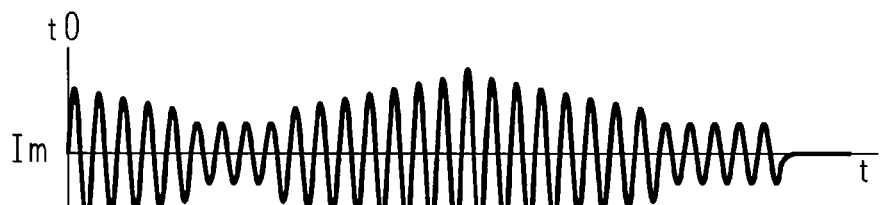
FIG. 3A through FIG. 3F are timing charts showing the operation of the control circuit of the phase splitting start single-phase induction motor according to the present invention.
Figure 3B:
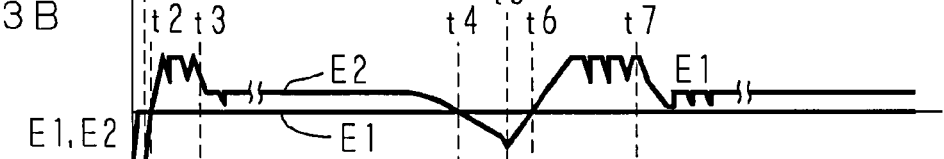
Figure 3C:
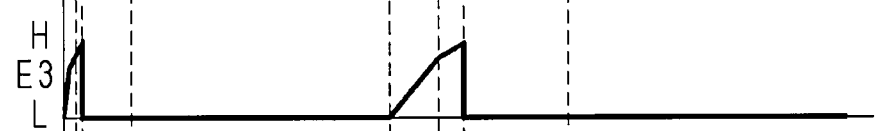
Figure 3D:
Figure 3E:
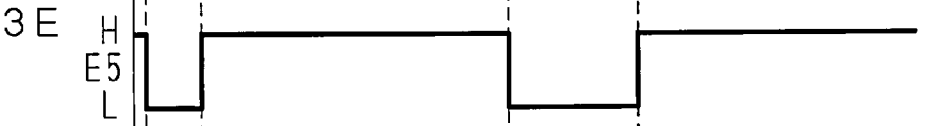
Figure 3F:
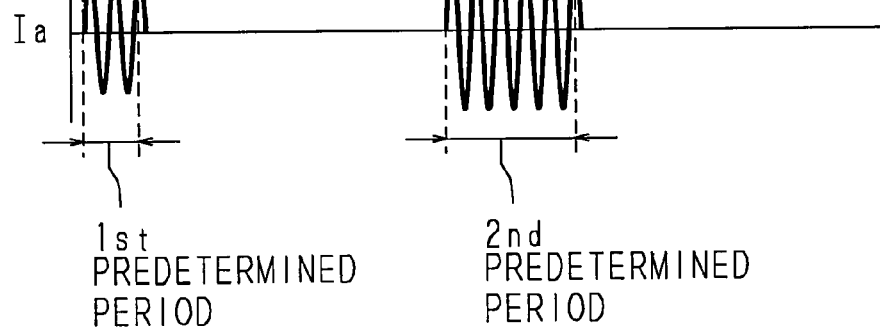

It is noted that FIG. 3A shows a current Im flowing into the main wiring 4, FIG. 3B shows input voltages E1 AND E2 to both input terminals of the first comparator 41, FIG. 3C shows an output voltage E3 from the output terminal of the first comparator 41, FIG. 3D shows input voltages E1 and E4 to both input terminals of the second comparator 51, FIG. 3E shows an output voltage E5 from the output terminal of the second comparator 51, and FIG. 3F shows a current Ia flowing into the auxiliary wiring 5, respectively.

At a start time t0, when a main switch (not shown) is turned on, the alternating current from the alternating current power source begins to be simultaneously fed between the terminals U, V and between the terminals X, Y. Thus, the alternating current Im flows into the main wiring 4, as shown in FIG. 3A.

Also at the same time, the control power source circuit 20 converts the alternating current fed from the terminals X, Y into the direct current and outputs as the direct current power source Vcc. The voltage E1 after the voltage of the direct current power source Vcc is divided by the resistors 21 and 22 is applied to each plus input terminal of the first comparator 41 and the second comparator 51, as shown in FIG. 3B.

At this time point, the electrolytic condenser 35 is not charged. Thus, as shown in FIG. 3B, the voltage E2 inputted to the minus input terminal of the first comparator 41 is lower than the voltage E1 (E2<E1). Hence, the output voltage E3 of the first comparator 41 becomes in an H level, as shown in FIG. 3C. For this reason, since a charge current flows from the direct current power source Vcc through the resistors 42, 43 and the diode 44, a charge voltage (positive pole voltage) E4 of the condenser 45 begins to be increased, as shown in FIG. 3D.

When the charge voltage E4 of the condenser 45 is gradually increased and becomes higher than the voltage E1 (E4>E1) at a time t1 as shown in FIG. 3D, an output voltage E5 of the second comparator 51 becomes in an L level as shown in FIG. 3E. In this case, the current flows from the direct current power source Vcc through a resistor 52 into the primary side (7a1) of the photo TRIAC 7a. Thus, a secondary side (7a2) of the photo TRIAC 7a is conducted. Consequently, a gate current If flows through the resistor 7b into the gate G of the TRIAC 7, and the TRIAC 7 is conducted. Since the TRIAC 7 is conducted, the alternating current Ia begins to flow into the auxiliary wiring 5, as shown in FIG. 3F. Hence, the motor 1 is started.

As mentioned above, when the TRIAC 7 is conducted, the current flows through the resistor 31 and the diode 32 into the parallel circuit composed of the Zener diode 33, the resistor 34 and the electrolytic condenser 35. Thus, the electrolytic condenser 35 is charged. The charge voltage (positive pole voltage) E2 of the electrolytic condenser 35 is increased until it is cramped by a Zener voltage of the Zener diode 33.

However, at a time t2 in the midst of increasing, the voltage E2 becomes higher than the voltage E1 (E2>E1), as shown in FIG. 3B.

It is noted that in the case where the diode 32 is shut off state in the state of E2>E1, more specifically in the case where the alternating current Im is minus, in such a way that only a part is shown in FIG. 3B, the electrolytic condenser 35 is discharged through the resistor 34. Thus, the voltage E2 is periodically decreased. However, the charge voltage E2 at that time is never lower than the voltage E1 in the ordinal operational state.

As mentioned above, at a time t2, when the voltage E2 becomes higher than the voltage E1 (E2>E1), the output voltage E3 of the first comparator 41 becomes in the L level, as shown in FIG. 3C. Consequently, since the charge current flows from the electrolytic condenser 45 through the resistor 43, the charge voltage E4 of the electrolytic condenser 45 begins to be decreased, as shown in FIG. 3D. As the charge voltage E4 is decreased, it becomes lower than the voltage E1 (E4<E1) at a time t3. Thus, as shown in FIG. 3E, since the output voltage E5 of the second comparator 51 becomes in the H level, the current flowing into the primary side (7a1) of the photo TRIAC 7a is shut off. Thus, the secondary side (7a2) of the photo TRIAC 7a becomes non-conducing state. Consequently, since the gate current If of the TRIAC 7 is shut off, the TRIAC 7 also becomes non-conductive state. Hence, as shown in FIG. 3F, the alternating current Ia flowing into the auxiliary wiring 5 is shut off. It is noted that the period (t3−t1) from the above mentioned time t1 (the time when the output voltage E5 of the second comparator 51 becomes in the L level) to the time t3 (the time when the output voltage E5 of the second comparator 51 becomes in the H level) is a first predetermined period.

In the states on and after the time t3, the rotation speed of the motor 1 is increased to a predetermined rotation speed or more. Thus, as shown in FIG. 3A, the motor 1 is driven and rotated only by the current Im flowing through the main wiring 4. On the other hand, the current Ia into the auxiliary wiring 5 is shut off. Hence, the voltage is induced correspondingly to the rotation speed of the motor 1.

It is noted that, when the TRIAC 7 is non-conducing state, the charge voltage E2 of the electrolytic condenser 35 is dropped. However, as the foregoing induced voltage is applied through the resistor 31 and the diode 32, the relation of E2>E1 is kept, as shown in FIG. 3B.

It is noted that the motor 1 which is being rotated only by the current Im flowing through the main wiring 4 as mentioned above is beyond its performance and becomes in the overload state, when the paper of the quantity exceeding the performance of a cutting mechanism is supplied while the shredder is cutting the paper. As this result, the rotation speed of the motor 1 is reduced, thereby decreasing the voltage induced in the auxiliary wiring 5.

Since the voltage induced in the auxiliary wiring 5 is decreased, the charge current is not supplied to the electrolytic condenser 35. Thus, the electrolytic condenser 35 is discharged through the resistor 34. As this result, at the time t4, as shown in FIG. 3B, the voltage E2 becomes lower than the voltage E1 (E2<E1). Hence, as shown in FIG. 3C, the output voltage E3 of the first comparator 41 begins to be increased. Consequently, the charge current begins to flow from the direct current power source Vcc through the resistors 42, 43 and the diode 44 into the electrolytic condenser 45. As this result, as shown in FIG. 3D, the charge voltage E4 of the electrolytic condenser 45 begins to be increased.

When the charge voltage E4 of the electrolytic condenser 45 is increased and becomes higher than the voltage E1 at the time t5 (E4>E1), the output voltage E5 of the second comparator 51 becomes in the L level, as shown in FIG. 3E. As this result, since the current flows from the direct current power source Vcc through the resistor 52 in the primary side (7a1) of the photo TRIAC 7a, the secondary side (7a2) of the photo TRIAC 7a is conducted. Consequently, since the gate current If flows through the resistor 7b into the gate G of the TRIAC 7, the TRIAC 7 is conducted. Since the TRIAC 7 is conducted, the alternating current Ia begins to flow into the auxiliary wiring 5, as shown in FIG. 3F. Thus, the rotation speed of the motor 1 is increased and the output torque is also increased. As this result, the shredder begins to cut the paper smoothly. Also, the motor 1 can be avoided from becoming in the stop state because the rotation speed is increased. Hence, as shown in FIG. 3A, the current Im flowing into the main wiring 4 of the motor 1 is reduced, and it returns to the ordinal operation state.

As mentioned above, when the TRIAC 7 is conducted, the current flows through the resistor 31 and the diode 32 into the parallel circuit composed of the Zener diode 33, the resistor 34 and the electrolytic condenser 35. As this result, the electrolytic condenser 35 is charged. The charge voltage (positive pole voltage) E2 of the electrolytic condenser 35 is increased until it is cramped by the Zener voltage of the Zener diode 33. However, at the time t6 in the midst of increasing, as shown in FIG. 3B, the voltage E2 becomes higher than the voltage E1 (E2>E1).

It is noted that in the case where the diode 32 is shut off state in the state of E2>E1, more specifically in the case where the alternating current Im is minus, the electrolytic condenser 35 is discharged through the resistor 34, as shown in FIG. 3B. As this result, the voltage E2 of the electrolytic condenser 35 is periodically decreased. However, the charge voltage E2 at that time is never lower than the voltage E1 in the ordinal operational state.

At the time t6, as shown in FIG. 3B, when the voltage E2 becomes higher than the voltage E1 (E2>E1), the output voltage E3 of the first comparator 41 becomes in the L level, as shown in FIG. 3C. As this result, since the charge current flows from the electrolytic condenser 45 through the resistor 43, the charge voltage E4 of the electrolytic condenser 45 begins to be decreased, as shown in FIG. 3D. As the charge voltage E4 is decreased and as shown in FIG. 3D, it becomes lower than the voltage E1 (E4<E1) at the time t7, the output voltage E5 of the second comparator 51 becomes in the H level, as shown in FIG. 3E. As this result, the current flowing into the primary side (7a1) of the photo TRIAC 7a is shut off. Hence, the secondary side (7a2) of the photo TRIAC 7a becomes non-conducing state.

Consequently, since the gate current If of the TRIAC 7 is shut off, the TRIAC 7 becomes non-conducing state. Thus, as shown in FIG. 3F, the alternating current Ia flowing into the auxiliary wiring 5 is shut off.

It is noted that the period (t7−t5) from the above mentioned time t5 (the time when the output voltage E5 of the second comparator 51 becomes in the L level) to the time t7 (the time when the output voltage E5 of the second comparator 51 becomes in the H level) is a second predetermined period.

Hereafter, similarly, while the shredder is used to cut the paper, each time it exceeds the cutting performance and becomes in the overload state and the rotation speed of the motor is decreased, the TRIAC 7 is conducted for a second predetermined time. As this result, since the alternating current Ia flows into the auxiliary wiring 5, the shredder can smoothly cut the paper.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalent of such metes and bounds there-of are therefore intended to be embraced by the claims.

What is claimed is:

1. A method for controlling a drive of a phase splitting start single-phase induction motor having an auxiliary wiring for starting, comprising the steps of:

feeding a current to said auxiliary wiring for a first predetermined period, after a power source is turned on;

interrupting the current fed to said auxiliary wiring and detecting a voltage induced in said auxiliary wiring, after an elapse of said first predetermined period;

judging whether or not the detected induced voltage is lower than a predetermined voltage; and feeding the current to said auxiliary wiring for a second predetermined period, each time said induced voltage is judged to be lower than the predetermined voltage.

2. The method as set forth in claim 1, wherein said motor is used to drive a shredder for cutting a paper, in said step of judging, the voltage induced in said auxiliary wiring is judged to be lower than said predetermined voltage when said shredder becomes in a state where the paper can not be cut, and by feeding the current to said auxiliary wiring for said second predetermined period, said shredder becomes in a state where the paper can be cut.

3. A control circuit for driving and controlling a phase splitting start single-phase induction motor having an auxiliary wiring for starting, comprising:

current feeding means for feeding a current to said auxiliary wiring;

interrupting means for interrupting the current fed to said auxiliary wiring and detecting means for detecting a voltage induced in said auxiliary wiring;

judging means for judging whether the induced voltage detected by said detecting means is lower than a predetermined voltage; and controlling means for controlling said current feeding means, interrupting means, detecting means and judging means so that after a power source is turned on, said motor is started by once feeding the current to said auxiliary wiring for a first predetermined period, interrupting the current fed to said auxiliary wiring and detecting the voltage induced in said auxiliary wiring after the current is fed for the first predetermined period, and each time the induced voltage detected by said detecting means is judged to be lower than the predetermined voltage by said judging means, the current is fed to said auxiliary wiring for a second predetermined period.

4. The control circuit as set forth in claim 3, wherein said motor is used to drive a shredder for cutting a paper, said judging means judges that the voltage induced in said auxiliary wiring is lower than said predetermined voltage when said shredder becomes in a state where the paper ban not cut, and said controlling means makes said shredder become in a state where the paper can be cut, by controlling said current feeding means so that the current is fed to said auxiliary wiring for said second predetermined period, each time said judging means judges that the voltage induced in said auxiliary wiring is lower than said predetermined voltage.

5. The control circuit as set forth in claim 3, wherein said current feeding means including:

first current feeding means for, after a power source is turned on, starting said motor by once feeding the current to said auxiliary wiring for a first predetermined period; and second current feeding means for, after the current is fed for the first predetermined period, each time the induced voltage detected by said detecting means is judged to be lower than the predetermined voltage by said judging means, feeding the current to said auxiliary wiring for a second predetermined period.

6. The control circuit as set forth in claim 5, wherein said motor is used to drive a shredder for cutting a paper, said judging means judges that the voltage induced in said auxiliary wiring is lower than said predetermined voltage when said shredder becomes in a state where the paper ban not cut, and said controlling means makes said shredder become in a state where the paper can be cut, by controlling said current feeding means so that the current is fed to said auxiliary wiring for said second predetermined period, each time said judging means judges that the voltage induced in said auxiliary wiring is lower than said predetermined voltage.

* * * * *